United States Patent
Peng et al.

(10) Patent No.: US 8,786,729 B2
(45) Date of Patent: Jul. 22, 2014

(54) WHITE BALANCE METHOD AND APPARATUS THEREOF

(75) Inventors: Shih-Yuan Peng, New Taipei (TW);
Hsin-Te Wang, Caotun Township (TW);
Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 149 days.

(21) Appl. No.: 13/551,199

(22) Filed: Jul. 17, 2012

(65) Prior Publication Data

US 2013/0242130 A1    Sep. 19, 2013

(30) Foreign Application Priority Data

Mar. 19, 2012   (TW) .............................. 101109249 A

(51) Int. Cl.
*H04N 9/73* (2006.01)

(52) U.S. Cl.
USPC ..................................... 348/223.1; 348/222.1

(58) Field of Classification Search
USPC .......................................... 348/222.1, 223.1
See application file for complete search history.

(56) References Cited

U.S. PATENT DOCUMENTS

| | | | |
|---|---|---|---|
| 2002/0101516 A1* | 8/2002 | Ikeda ............................ | 348/223 |
| 2009/0225226 A1* | 9/2009 | Kakuta ......................... | 348/655 |
| 2010/0020192 A1* | 1/2010 | Kim et al. .................. | 348/223.1 |
| 2011/0234845 A1* | 9/2011 | Fujiwara et al. ........... | 348/223.1 |

* cited by examiner

*Primary Examiner* — Gevell Selby
(74) *Attorney, Agent, or Firm* — Wang Law Firm, Inc.; Li K. Wang; Stephen Hsu

(57) ABSTRACT

An entered image is divided into a plurality of windows and it is determined, on a per-window basis, whether the image data within an applicable window is indicative of the color white, based upon the position of each window in the image and the continuity to its surrounding divided windows. A white balance method is performed based upon data of a window determined to be indicative of the color white. The present invention conducts a white balance process through the addition of determining the light source type weight and calculating the continuity of each divided window and its surrounding divided windows. In order the white balance process to accurately obtain the colors of an entered image even under the conditions of specific scenes with distinctive colors.

13 Claims, 11 Drawing Sheets

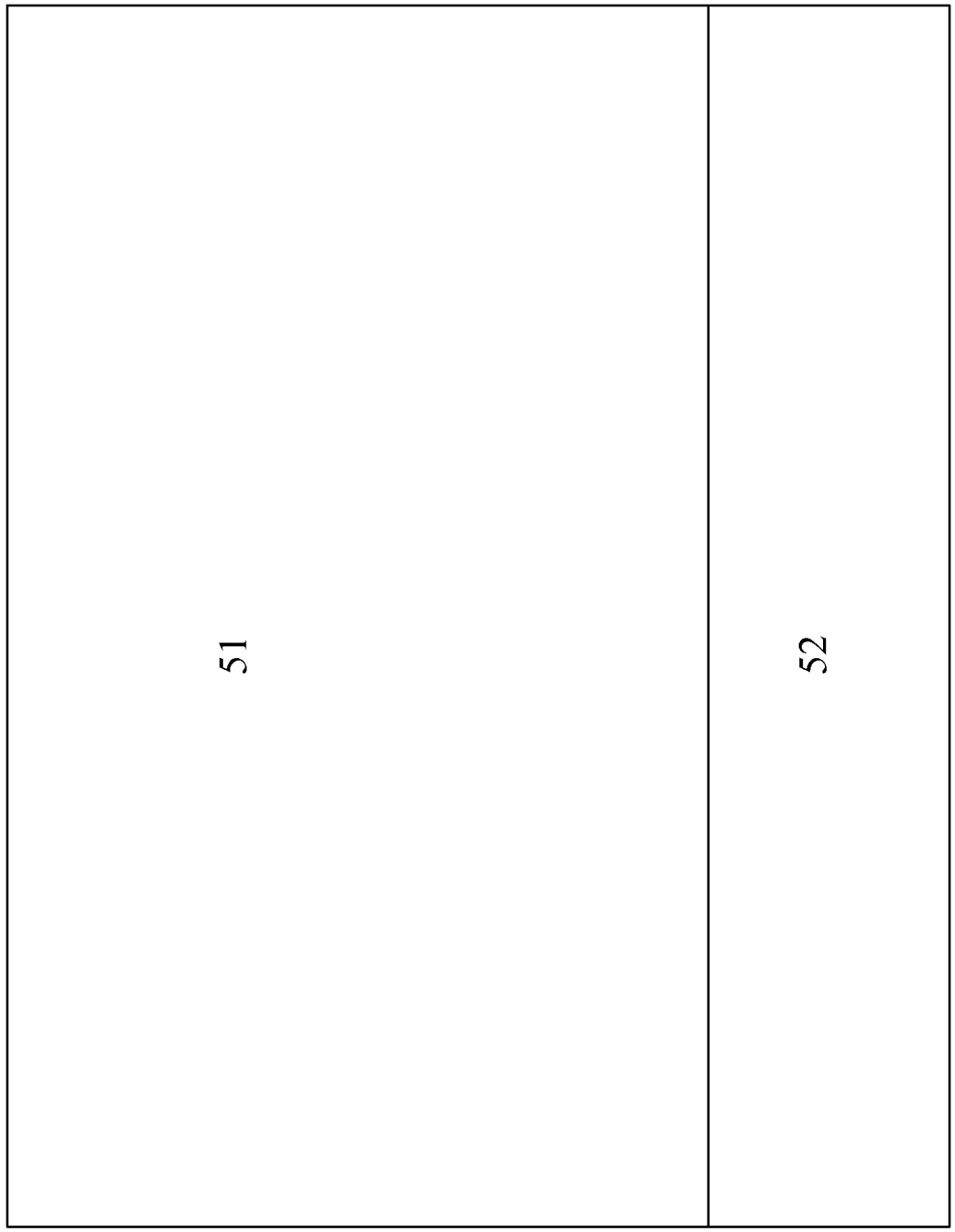

| | | | |
|---|---|---|---|
| 5010 | 5009 | 5011 | 5015 |
| 5005 | 5001 | 5008 | 5014 |
| 5003 | 5000 | 5004 | 5012 |
| 5006 | 5002 | 5007 | 5013 |

FIG. 4B

| 6010 | 6009 | 6011 | 6015 |
|------|------|------|------|
| 6006 | 6004 | 6008 | 6014 |
| 6001 | 600  | 6002 | 6012 |
| 6005 | 6003 | 6007 | 6013 |

FIG. 5B

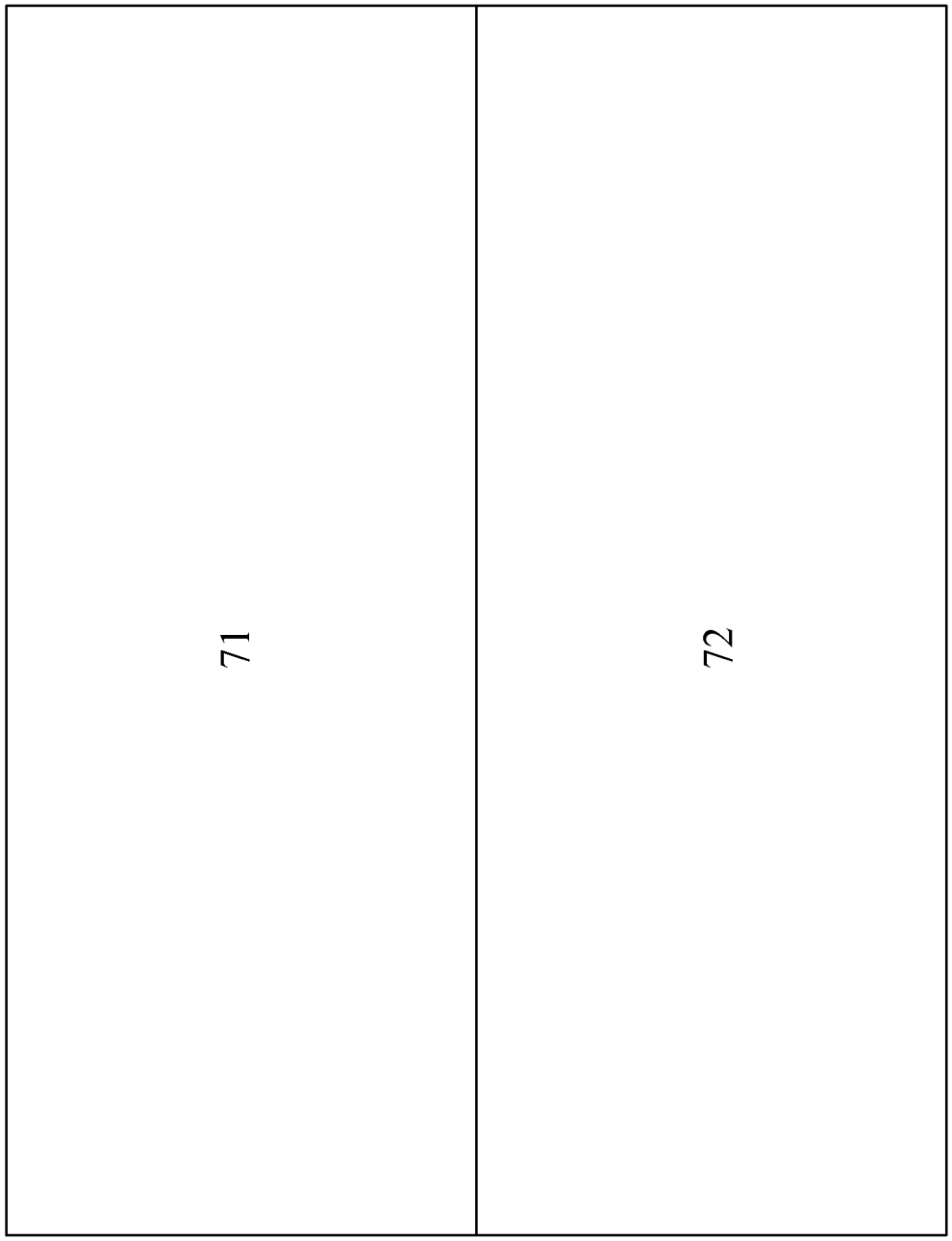

| 7015 | 7013 | 7014 | 7016 |
|------|------|------|------|
| 7012 | 701  | 7011 | 7017 |
| 7021 | 702  | 7022 | 7026 |
| 7024 | 7023 | 7025 | 7027 |

FIG. 6B

| | | | |
|---|---|---|---|
| 8019 | 8021 | 8020 | 8025 |
| 8016 | 8011 | 8018 | 8024 |
| 8014 | 801 | 8013 | 8022 |
| 8015 | 8012 | 8017 | 8023 |

FIG. 7B

WHITE BALANCE METHOD AND APPARATUS THEREOF

CROSS-REFERENCE TO RELATED APPLICATION

This application claims the benefit of Taiwan Patent Application No. 101109249, filed on Mar. 19, 2012, in the Taiwan Intellectual Property Office, the disclosure of which is incorporated herein in its entirety by reference.

BACKGROUND OF THE INVENTION

1. Field of the Invention

The present invention relates to a white balance method and an apparatus thereof, and more particularly to the white balance method and apparatus that divide an image into a plurality of windows, and then analyze image data of each window to reduce a color white misjudgment in a scene.

2. Description of Related Art

As digital cameras are introduced continuously, image sensors such as a charge-coupled device (CCD) or a complementary metal oxide semiconductor (CMOS) sensor play an important role, since the image sensor cannot distinguish the colors of external environment, and thus the digital cameras generally perform a white balance process during image preview or image capture.

In general, the color of light reflected from an object depends on the color of the light source, our brain is able to detect and correct such a color change, so that we can see the existence of a white object regardless of observing conditions such as under the sun, in a rainy day, or with indoor fluorescent light. However, sensing devices cannot distinguish the colors of the external ambient lights, so the color of the observed white object detected by the sensing devices varies with different light sources, some are slightly yellow or red, and some are slightly blue. To produce an image that is closer to human vision, digital cameras generally adjust the color according to the detected light source, so that the white color that can be seen by the human eye can be observed in the final image, this adjustment is called white balance process.

In traditional white balance technology, when the camera faces a scene with a blue sky and this blue sky background is included within the range of analyzing the white balance of the image of the scene, a huge quantity of image data of blue color with a high color temperature will be used for analyzing the white balance, such that after the image goes through the white balance process, the corrected image will have a color with a color temperature lower than that of the original entered image.

Therefore, conventional technology proposes a method of dividing the entered image into a plurality of windows, and then performs a color white identification of image data in each divided window, and imposes a stricter limitation to the image data of positions on the top part of the entered image and on the white pixel detection range of images with a high color temperature, so that high color temperature pixels are excluded from the analysis of for white pixel detection to avoid misjudgment occurring during the white balance process of a scene with a large piece of blue sky. As a result, the white balance result can show a user's expected outstanding blue color.

However, the conventional white balance analysis and correcting method that divides the images only emphasizes on the upper and lower positional in relation to the windows and uses the color temperature value to limit the color white detection range. However this method neglects the overall picture content and also does not perform further analysis on the image light source. In other words, when the windows disposed on the upper part of an image are mostly images with a high color temperature, the continuity of each divided window still have to be considered to accurately determine whether the current scene is an outdoor blue sky scene in order to avoid a misjudgment of an entered image with a plurality of objects with a high color temperature disposed on its upper area and also avoid possible deviations or errors of the white balance correction result.

In addition, the prior art limits the color white detection range of the image data falling within the divided range based on the position of each window. In special situations where there are no color white information in the window that can be used for white color identification, a deviation or error of the white balance correction result may result.

In view of the aforementioned problems of the prior art, the present invention divides a captured image into a plurality of windows, and then the image data, light source and position of each window are analyzed to perform a white balance method, so as to overcome the drawback of the conventional white balance technology effectively.

SUMMARY OF THE INVENTION

Conventional white balance technology neglects the overall picture content and the image light source and does not analyze the continuity of the each divided window. It will easily cause misjudgments on the image content when determining the content of a current scene while leaving the white balance correction method with biased results. In view of the aforementioned problems, it is a primary objective of the invention to provide a white balance method and apparatus thereof.

To achieve the foregoing objectives, the present invention provides a white balance method, comprising the steps of: capturing an entered image; dividing the entered image into a plurality of divided windows; performing a color white identification of each divided window to produce a color white identification result of each divided window; determining a weight of the color white identification result corresponding to each divided window according to a position of the each divided window in the entered image, and a continuity of the plurality of surrounding divided windows; using the color white identification result and the weight of the divided windows to calculate a white balance estimated value of the entered image; and using the white balance estimated value to perform a white balance process of the entered image.

Preferably, the continuity is that a color temperature difference between each divided window and the surrounding divided windows is lower than a default value.

Preferably, the step of determining the weight further comprises the steps of: dynamically determining a first light source type weight of the entered image according a brightness value of the divided entered image; determining whether the position of each divided window is disposed on a top, middle or bottom part of the entered image; determining whether a color temperature difference of images between each divided window and the surrounding divided windows complies with a default value to obtain a continuity determination result; determining a second light source type weight of the entered image according to the first light source type weight, the position of each divided window, and the continuity determination result, wherein the second light source type weight includes a plurality of outdoor light source type weights and a plurality of indoor light source type weights; and determining the weight of the color white identification result of each divided window according to the position of each divided window, the continuity determination result and the second light source type weight.

Preferably, the step of dynamically determining the first light source type weight of the entered image according to the brightness value of the entered image further comprises: using a plurality of color windows which are contained in the image and in compliance with a preset data, and the brightness value of the entered image to determine a first light source type weight of the entered image.

The white balance method of the present invention further comprises: selecting one or more color white identification windows from each divided window according to an image characteristic of the window, and using the image data of the one or more color white identification windows to perform the color white identification; wherein the image characteristic is a neutral color or a flat region.

The white balance method of the present invention further comprises: determining a color temperature threshold value of an entered image according to the entered image; correcting the white balance estimated value according to the color temperature threshold value of the entered image if the white balance estimated value is greater than the color temperature threshold value of the entered image; and performing by the white balance process by using the white balance estimated value if the white balance estimated value is equal to or less than the color temperature threshold value of the entered image.

The white balance method of the present invention further comprises: reducing the weight of the color white identification result of the at least one divided window disposed on the upper area of the entered image if the plurality of outdoor light source weight of a second light source type weight of an entered image is greater than a predetermined proportion, and the color temperature of each divided window disposed on the upper part the entered image is greater than a threshold value, and a color temperature difference between the divided window and the surrounding divided windows is lower than a default value.

The white balance method of the present invention further comprises: not adjusting the weight of the color white identification result of at least one divided window on the upper part the entered image if the plurality of outdoor light source weights of a second light source type weight of the entered image is smaller than a predetermined proportion; the color temperature of each divided window on the upper part of the entered image is greater than a threshold value, and a color temperature difference between each divided window and a surrounding divided windows is lower than a default value.

The white balance method of the present invention further comprises: reducing the weight of the color white identification result of at least one of the divided windows at the center of the entered image if a color temperature of a plurality of divided windows at the center of the entered image is smaller than a threshold value, and the color temperature difference between each divided window and a surrounding divided windows is lower than a default value.

The white balance method of the present invention further comprises: not adjusting the weight of the color white identification result of the divided windows when the plurality of outdoor light source weights of a second light source type weight of the entered image is greater than a predetermined proportion, and the divided windows on the upper part of the entered image has a first color temperature, and a color temperature difference between the windows is lower than a default value, and the divided windows on the lower part of the entered image has a second color temperature, and a difference of color temperature values between each divided window and the surrounding divided windows is lower than the default value.

Compared with the prior art, the present invention analyzes the light source type weight of the entered image, the position of the divided windows, and the continuity between each divided window and the surrounding divided windows to perform the white balance process, so as to obtain the color of the entered image accurately while highlighting the colors of the scene.

The present invention further provides a white balance apparatus, comprising: an image capturing unit, for capturing an entered image; a dividing unit, coupled to the image capturing unit for dividing the entered image into a plurality of divided windows; a color white identification unit, coupled to the dividing unit, for performing a color white identification of each divided window to produce a color white identification result of each divided window; a color white weight determination unit, coupled to the color white identification unit, and is capable of determining a weight corresponding to the color white identification result of each divided window according to the position of each divided window in the entered image and a continuity between each divided window and surrounding divided windows; a computing unit, coupled to the color white weight determination unit provided for calculating a white balance estimated value of the entered image by using the color white identification result and the weight of the divided windows; and a white balance process unit, coupled to the computing unit for performing a white balance process of the entered image by using the white balance estimated value.

The white balance apparatus of the present invention further comprises: a color white selecting unit, used in each divided window and provided for determining one or more color white identification windows according to an image characteristic of the window, and using the image data of the one or more color white identification windows as the color white identification; wherein the image characteristic is a neutral color or a flat region.

The white balance apparatus of the present invention further comprises: a correcting unit, coupled to the computing unit and the white balance process unit for correcting the white balance estimated value according to the color temperature threshold value of the entered image if the white balance estimated value is greater than the color temperature threshold value of the entered image; and performing the white balance process of the white balance estimated value if the white balance estimated value is equal to or less than the color temperature threshold value of the entered image.

Preferably, the color white weight determination unit further comprises: a light source type weight computing unit, for determining a first light source type weight; a position determination unit, coupled to the light source type weight determination unit, for determining a position of the divided window in the entered image; and a continuity determination unit coupled to the position determination unit, for determining whether the color temperature difference between each divided window and surrounding divided windows complies with a default value to determine a continuity determination result of each divided window; thereby, the light source type weight determination unit determines a second light source type weight of the entered image according to the first light source type weight, the position of each divided windows and the continuity determination result of each divided window; and the color white weight determination unit determines the weight of the white identification result of each divided window color according to the position of each divided window, the continuity determination result of each divided window, and the second light source type weight.

The advantages and technical characteristics of the present invention will become apparent with the detailed description of preferred embodiments accompanied with the illustration of related drawings as follows.

BRIEF DESCRIPTION OF THE DRAWINGS

FIG. 4A and FIG. 4B are schematic views of the white balance process of a scene with a blue sky theme in accordance with the present invention;

FIG. 5A and FIG. 5B are schematic views of the white balance process of a scene with a plurality of objects with specific color temperatures in accordance with the present invention;

FIG. 6A and FIG. 6B are schematic views of the white balance process of a scene with different consecutive color temperature windows in accordance with the present invention; and FIG. 7A and FIG. 7B are schematic views of handing the white balance of a scene with a human face at the center in accordance with the present invention.

DETAILED DESCRIPTION OF THE PREFERRED EMBODIMENTS

The technical contents and characteristics of the present invention will be apparent with the detailed description of a preferred embodiment accompanied with related drawings as follows. For simplicity, same numerals are used in the following preferred embodiment to represent respective same elements.

Figure 1:
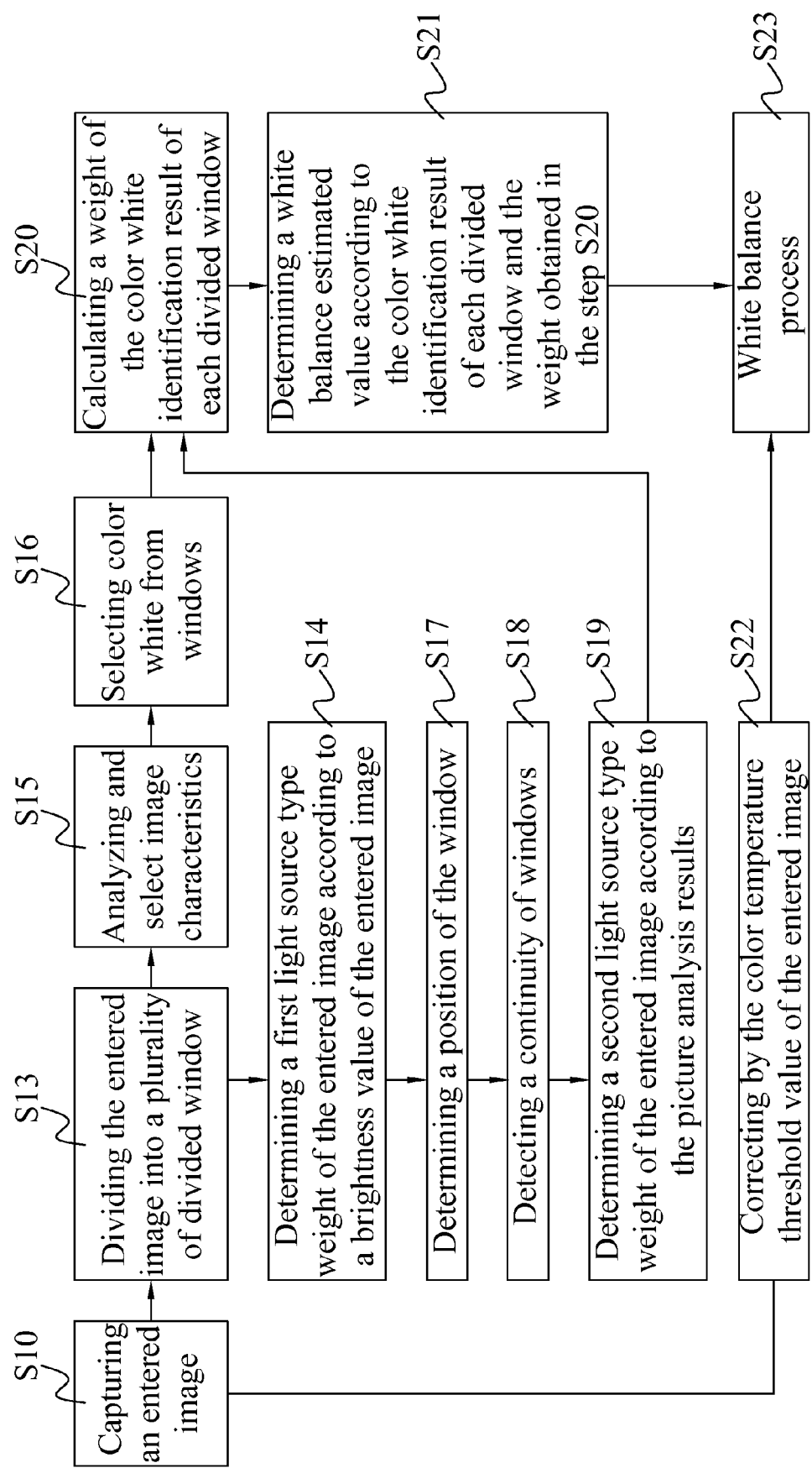
FIG. 1 is a flow chart of a white balance method of the present invention.

Most cameras are equipped with a white balance apparatus, and the present invention uses the present existing white balance apparatus of the digital camera together with window division, position identification, and determining method based on the relationship between each divided window and its surrounding divided windows to achieve an accurate white balance. The white balance method of the present invention uses an image capturing apparatus such as a digital camera to perform a white balance process. With reference to FIG. 1 for a flow chart of a white balance method of the present invention, the method comprises the following steps.

S10: Capturing an entered image, and determining a color temperature threshold value and a brightness value of the entered image.

S13: Dividing the entered image into a plurality of divided windows.

S15: Detecting a source of image data of one or more partial windows in each divided window according to an image characteristic for a color white analysis.

S16: Using the image data for a color white identification of the data of each divided window. In other words, a reference point most capable of representing a color in each window, and a characteristic curve and a standard deviation of $$\sigma = \sqrt{\frac{1}{N}\sum_{i=1}^{N}(x_i - \mu)^2}$$

and a mean value of $$\mu = \frac{1}{N}\sum_{i=1}^{N} x_i$$

in each divided window and close to a neutral color and belonging to a flat region are used for the color white identification.

After the entered image is divided into the plurality of windows in S13, the step S14 takes place.

S14: Determining a first light source type weight of the entered image according to a brightness value of the entered image;

S17: Determining a position of each divided window in the entered image.

S18: Detecting a continuity between each divided window and its surrounding divided windows.

S19: Determining a second light source type weight of the entered image according to the picture analysis results of S17 and S18.

S20: Calculating a weight of the color white identification result of each divided window by the information of S17~S19.

S21: Determining a white balance estimated value according to the color white identification result of each divided window and the weight obtained in the step S20.

If the white balance estimated value obtained in the step S21 exceeds the color temperature threshold value of the entered image, then the step S22 will be executed.

Figure 2:
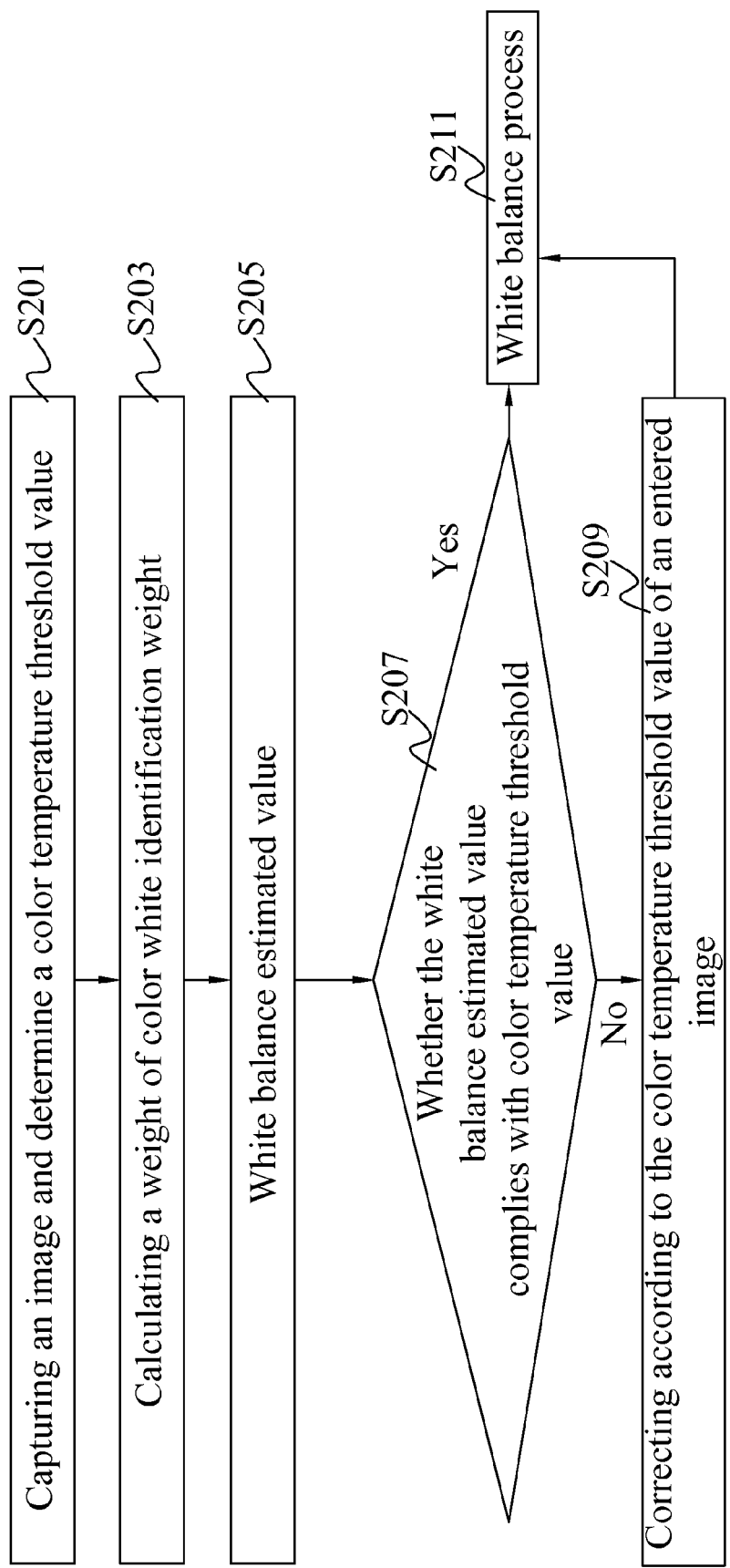
FIG. 2 is a flow chart of a mechanism of correcting a color temperature threshold value in accordance with the present invention.

S22: Correcting the white balance estimated value according to the color temperature threshold value of the entered image as shown in FIG. 2. In step S201, while an image is captured, a color temperature threshold value is determined. Then the weight of the color white identification weight is calculated according to step S203 to obtain a white balance estimated value as in step S205. In step S207, if the white balance estimated value complies with the color temperature threshold value, the white balance estimated value is directly used to perform a white balance process of the entered image. If in step S207, if the white balance estimated value does not complies with the color temperature threshold value, then the white balance estimated value is corrected according the color temperature threshold value of an entered image in step S209, The white balance estimated value after the correction should then be used to perform a white balance process of the entered image as shown in step S211. Wherein, the correction method can be a dynamic interpolation method. If the difference between the color temperature threshold value and the white balance estimated value increases, then the corrected value will increase. If the difference between the color temperature threshold value and the white balance estimated value decreases, then the corrected value will decreased. On the other hand, if the white balance estimated value complies with the color temperature threshold value of the entered image, then the step S23 will be executed.

S23: Directly using the white balance estimated value for performing a white balance process of the entered image. Wherein, the color white identification is a prior art, and thus will not be described here.

However, the image capturing device used in the foregoing preferred embodiment of the present invention includes, but not limited to a digital camera, a Smartphone with a camera function, or a notebook computer with a camera function.

The spirit of the present invention has been described, and preferred embodiments are provided for illustrating the method of the present invention to enable persons ordinarily skilled in the art to implement the invention.

With reference to FIG. 4A, a scene with a blue sky in a sunny day is used as an example, and the blue sky occupies a vast majority of the image, and the white balance method of the present invention comprises the following steps:

After an entered image is captured, a color temperature threshold value and a brightness value of the entered image are determined. The entered image is divided into a plurality of divided windows, and a color white identification of each divided window is performed. A first light source type weight is dynamically determined according to a brightness value of the entered image. Specifically, the first light source type weight is determined according to the brightness value of the entered image and the plurality of color windows of the entered image which complies with the preset data. The first light source type weight, the position of each divided window and the color temperature difference between each divided window and its surrounding divided windows are examined to check if they are lower than a default value. A second light source type weight of the entered image is determined. A weight of the color white identification result corresponding to each divided window is determined according to the position of each divided window in the entered image, and the continuity between each divided window and the surrounding divided windows, and the second light source type weight of the entered image. Wherein, the second light source type weight includes a plurality of outdoor light source type weights and a plurality of indoor light source type weights. Now, most images on the upper half of the entered image has blue sky image data with a high color temperature (as indicated by Window 51 in FIG. 4A). Wherein, the color temperature values between each divided window on the upper part of the entered image and its surrounding divided windows are consecutive (In FIG. 4B, color temperature values of an window with "5000" which is the selected divided window, and its surrounding divided windows 5001, 5002, 5003, 5004, 5005, 5006, 5007, 5008, 5009, 5010 and 5011 are consecutive), and the outdoor light source weight of the second light source type weight of the entered image is greater than a predetermined proportion, so that the weight of the color white identification result of the window can be lowered to avoid adopting the large piece of blue image as the base for color white identification or cause the large piece of the blue sky image to show a white color, so as to obtain an accurate white balance and let the large piece of blue sky to be closer to what is seen by the human eye. The difference between the white balance estimated result and the color temperature value of the entered image is low and does not exceed the color temperature threshold value of the entered image, so that it is not necessary to adjust the white balance estimated value, and the value can be used as a basis for the white balance directly.

Figure 5A:
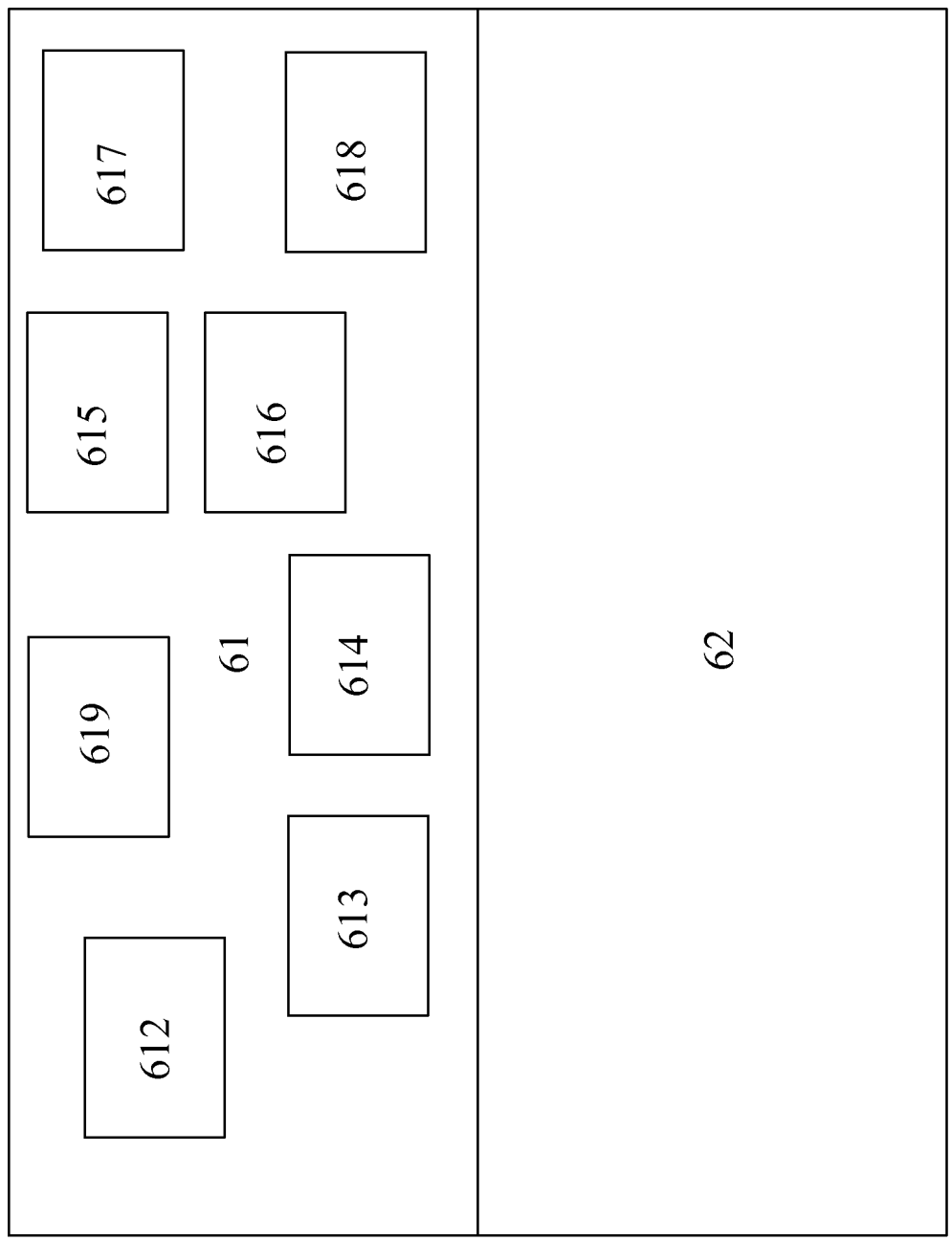

With reference to FIG. 5A for an example of an indoor scene with a plurality of objects of a high color temperature disposed on the upper part of the image, and the white balance method of the present invention comprises the following steps:

After an entered image is captured, a color temperature threshold value and a brightness value of the entered image are determined. The entered image is divided into a plurality of divided windows, and a color white identification of each divided window is performed. A first light source type weight is dynamically determined according to a brightness value of the entered image. The first light source type weight, the position of each divided window and the color temperature difference between each divided window and its surrounding divided windows are examined to check if they are lower than a default value. A second light source type weight of the entered image is determined. A weight of the color white identification result corresponding to each divided window is determined according to the position of each divided window in the entered image, the continuity between each divided window and the surrounding divided windows, and the second light source type weight. Now, although most images on the upper half of the entered image has blue sky image data with a high color temperature (as indicated by 612, 613, 614, 615, 616, 617, 618 in FIG. 5A), yet the color temperature values between each divided window on the upper part of the entered image and its surrounding divided windows are not consecutive (In FIG. 5B, the color temperature values of a window "600" which is a selected a divided window and its surrounding divided windows 6001, 6002, 6003, 6004, 6005, 6006, 6007, 6008, 6009, 6010 and 6011 are not consecutive). In addition, the weight of the second light source type weight of the entered image has an outdoor light source weight smaller than a predetermined proportion, such that this scene is not determined with an outdoor scene with a large piece of blue sky, and the color balance of the overall picture must be taken into consideration for color white identification. Therefore, the weight of the color white identification result of the plurality of divided windows on the upper part of the entered image will not be reduced for the white balance estimation. The difference between the white balance estimated result and the color temperature value of the entered image is low and does not exceed the color temperature threshold value of the entered image, so that it is not necessary to adjust the white balance estimated result, and the estimated result can be used as a basis for the white balance directly.

With reference to FIG. 6A, an outdoor scene with a blue sky and a green land is used as an example, and the white balance method of the present invention comprises the following steps:

After an entered image is captured, a color temperature threshold value and a brightness value of the entered image are determined. The entered image is divided into a plurality of divided windows, and a color white identification of each divided window is performed. A first light source type weight is dynamically determined according to a brightness value of the entered image. The first light source type weight, the position of each divided window and the color temperature difference between each window and its surrounding windows are examined to check if they are lower than a default value. A second light source type weight of the entered image is determined. A weight of the color white identification result corresponding to each divided window is determined according to the position of each divided window in the entered image, and the continuity between each divided window and the surrounding divided windows, and the second light source type weight. Now, most images on the upper half of the entered image has image data with a high color temperature (as indicated by Window 71 in FIG. 6A). Wherein, the color temperature values of each divided window on the upper part of the entered image and its surrounding divided windows are consecutive (In FIG. 6B, color temperature values of an window with "701" which is the selected divided window, and its surrounding divided windows 7011, 7012, 7013, 7014, 7015, 7016, 7017 are consecutive), and the outdoor light source weight of the second light source type weight of the entered image is greater than a predetermined proportion, so that the scene is determined as an outdoor scene with a blue sky. The weight of the color white identification result of the plurality of divided windows of the entered image that originally should be reduced is used for the white balance estimation. However, the divided window on the lower part of the entered image has a second color temperature (as indicated by Window 72 of FIG. 6A), and the color temperature values between each divided window and its surrounding divided windows are consecutive (In FIG. 6B, color temperature values of an window with "702" which is the selected divided window, and its surrounding divided windows 7021, 7022, 7023, 7024, 7025, 7026, 7027 are consecutive), and the weight of the color white identification result of all divided windows are not adjusted to avoid a particular emphasis of the color temperature on a certain window either 71 or 72 of FIG. 6A and an unbalanced white balance result of the image. The difference between the white balance estimated result and the color temperature value of the entered image is low and does not exceed the color temperature threshold value of the entered image, so that it is not necessary to adjust the white balance estimated result, and the estimated result can be used as a basis for the white balance directly.

Figure 7A:
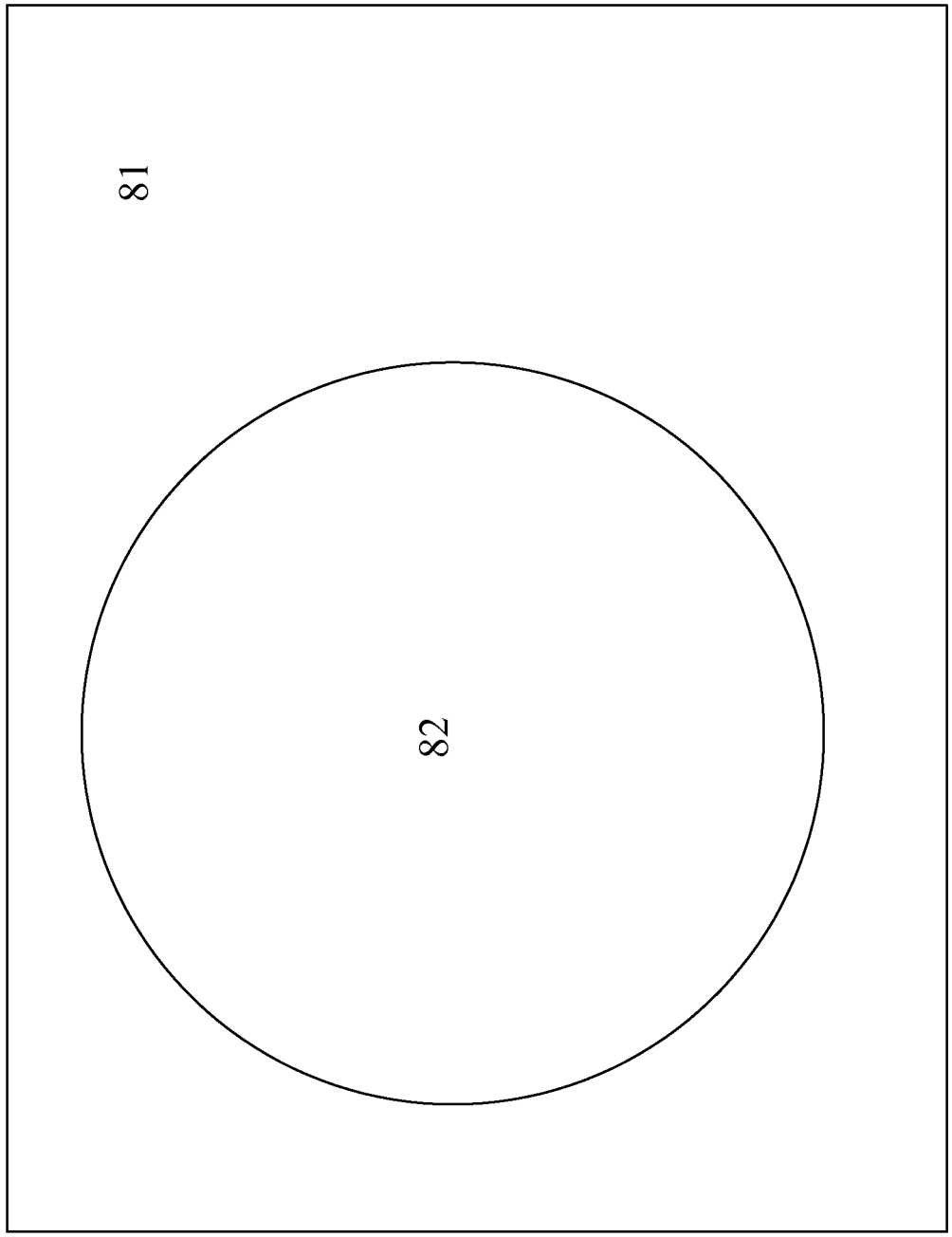

With reference to FIG. 7A, a general picture with a human face at the center is used as an example, and the white balance method of the present invention comprises the following steps:

After an entered image is captured, a color temperature threshold value and a brightness value of the entered image are determined. The entered image is divided into a plurality of divided windows, and a color white identification of each divided window is performed. A first light source type weight is dynamically determined according to a brightness value of the entered image. The first light source type weight, the position of each divided window and the color temperature difference between each window and its surrounding divided windows are examined to check if they are in compliance with a default value. A second light source type weight of the entered image is determined. A weight of the color white identification result corresponding to each divided window is determined according to the position of each divided window in the entered image, and the continuity between divided window and the surrounding divided windows, and the second light source type weight. Now, a large piece of image with image data of a low color temperature is situated at the center of the entered image (as indicated by Window 82 in FIG. 7A). Wherein, the color temperature values of each divided window at the center of the entered image and the plurality of surrounding divided windows are consecutive (In FIG. 7B, color temperature values of an window with "801" which is the selected divided window, and its surrounding divided windows 8011, 8012, 8013, 8014, 8015, 8016, 8017, 8018 are consecutive), so that the picture primarily having a human face requires reducing the weight of the color white identification result of the plurality of divided windows at the center of the entered image for the white balance estimation to avoid the face shown in the window with a pale color. The difference between the white balance estimated result and the color temperature value of the entered image is low and does not exceed the color temperature threshold value of the entered image, so that it is not necessary to adjust the white balance estimated result, and the estimated result can be used as a basis for the white balance directly.

In an entered image having a scene of very low color temperature such as an entered image in a tunnel, the white balance method of the present invention comprises the following steps:

After an entered image is captured, a color temperature threshold value is determined, and the entered image is considered as an indoor scene having a low color temperature and its brightness value is lower than a threshold value. The entered image is divided into a plurality of divided windows; and a color white identification of each divided window is performed. A first light source type weight is dynamically determined according to a brightness value of the entered image. The first light source type weight, the position of each divided window and the color temperature difference between each window and its surrounding windows are examined to check if they are lower than a default value. A second light source type weight of the entered image is determined. A weight of the color white identification result corresponding to each divided window is determined according to the position of each divided window in the entered image, and the continuity between each divided window and the surrounding divided windows, and the second light source type weight. Since the plurality of divided windows are images with a low color temperature, therefore it is not necessary to adjust the weight of each window color white identification result, but the color white identification result and the weight of the divided windows are used for calculating a white balance estimated value of the entered image. The difference between the white balance estimated result (wherein the image is corrected to slightly white) and the color temperature value (low color temperature) of the entered image is high and exceeds the color temperature threshold value of the entered image, so that a dynamic interpolation method is used for correcting the color temperature to the windows with a color temperature close to the color temperature threshold value to be closer to the observation result of the human eye.

Figure 3:
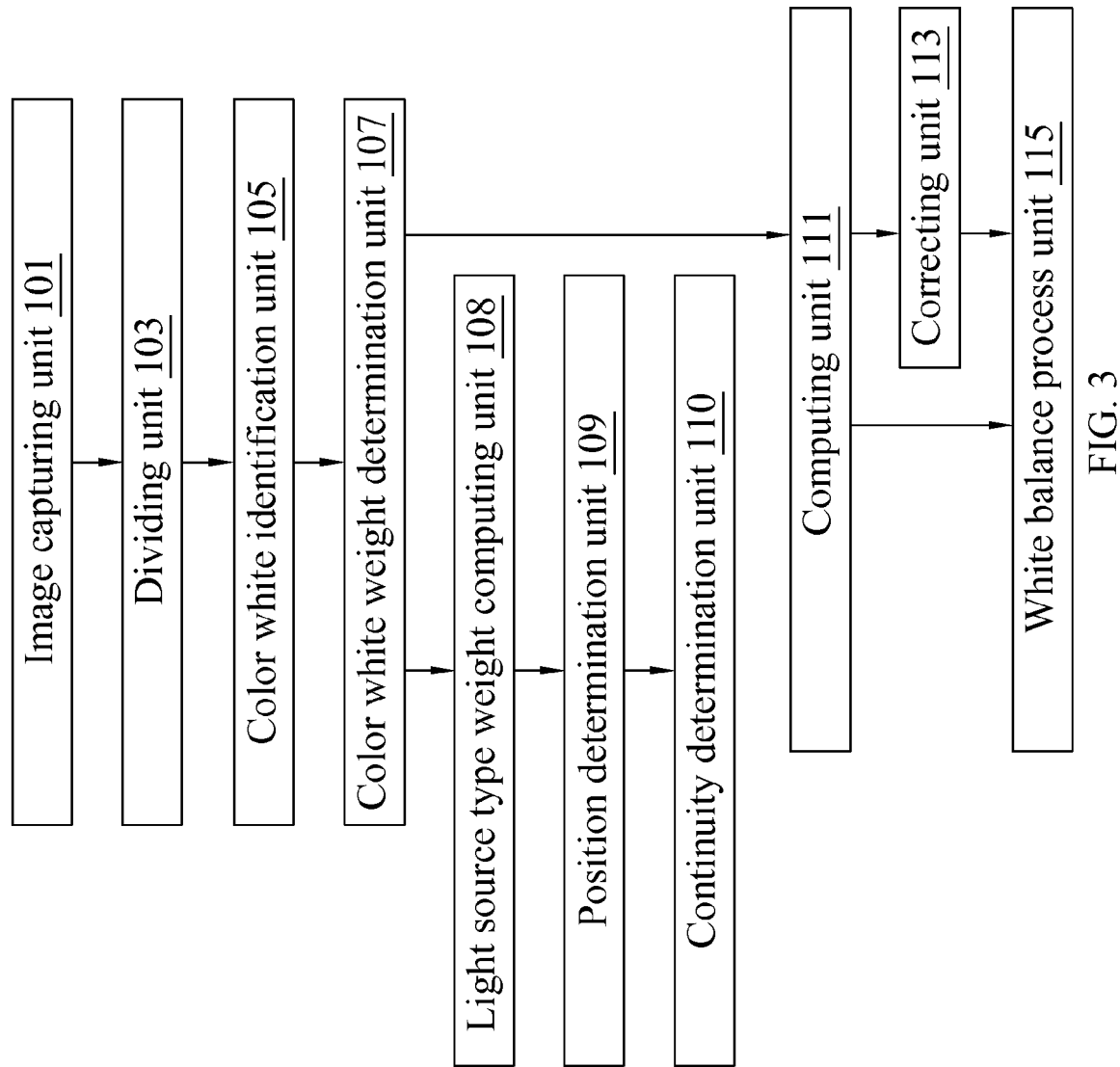
FIG. 3 is a block diagram of a white balance apparatus in accordance with the present invention.

With reference to FIG. 3 for a block diagram of a white balance apparatus in accordance with the present invention, the white balance apparatus comprises an image capturing unit (101), a dividing unit (103), a color white identification unit (105), a color white weight determination unit (107), a light source type weight computing unit (108), a position determination unit (109), a continuity determination unit (110), a computing unit (111), a correcting unit (113), and a white balance process unit (115).

The image capturing unit (101) is provided for capturing an entered image, and the dividing unit (103) coupled to the image capturing unit is provided for dividing the entered image into a plurality of divided windows. The color white selection unit 104 is coupled to the dividing unit. The color white identification unit and is used in each divided window. It is provided for determining one or more color white identification windows according to an image characteristic of the window while using image data from one or more of the color white identification windows as the color white identification. Wherein, the image characteristic is a neutral color or a flat region. The color white identification unit (105) coupled to the dividing unit performs a color white identification of each divided window to produce a color white identification result of each divided window. The color white weight determination unit (107) coupled to the color white identification unit determines a weight of the color white identification result corresponding to each divided window according to the position of each divided window in the entered image, and a continuity of its surrounding divided windows, wherein the color white weight determination unit (107) further comprises: a light source type weight computing unit (108) for determining a first light source type weight; a position determination unit (109) coupled to the light source type weight determination unit for determining a position of the divided window in the entered image; a continuity determination unit (110) coupled to the position determination unit for determining whether a color temperature difference between each divided window and the surrounding divided windows complies with a default value. In addition, the light source type weight determination unit can determine a second light source type weight of the entered image according to the first light source type weight, the position of each divided window, and the continuity determination result of each divided window. In addition, the color white weight determination unit (107) can determine the weight of each divided window color white identification result according to the position of each divided window, the continuity determination result of each divided window, and the weight of the second light source type weight.

A computing unit (111) coupled to the color white weight determination unit uses the color white identification result and weight of the divided windows to calculate a white balance estimated value of the entered image; a correcting unit (113) couple to the computing unit and the white balance process unit is provided for correcting the white balance estimated value according to the color temperature threshold value of the entered image if the white balance estimated value exceeds the entered image color temperature threshold value; and using the white balance estimated value for the white balance process. A white balance process unit (115) coupled to the computing unit is used for performing a white balance process of the entered image by using the white balance estimated value, if the white balance estimated value does not exceed the entered image color temperature threshold value.

The invention improves over the prior art and complies with patent application requirement, and thus is duly filed for patent application. While the application has been described by device of specific embodiments, numerous modifications and variations could be made thereto by those generally skilled in the art without departing from the scope and spirit set forth in the claims.

What is claimed is:

1. A white balance method, comprising the steps of:
capturing an entered image;
dividing the entered image into a plurality of divided windows;
performing a color white identification of each divided window to produce a color white identification result of each divided window;
determining a weight of the color white identification result corresponding to each divided window according to a position of the each divided window in the entered image, and a continuity of the plurality of surrounding divided windows;
using the color white identification result and the weight of the divided windows to calculate a white balance estimated value of the entered image; and
using the white balance estimated value to perform a white balance process of the entered image;
wherein the continuity defines a color temperature difference between each window and a plurality of surrounding divided windows lower than a default value.

2. The white balance method of claim 1, wherein the step of determining the weight further comprises the steps of:

dynamically determining a first light source type weight of the entered image according to a brightness value of the entered image;
determining whether the position of each divided window is disposed on top, middle or bottom part of the entered image;
determining whether the color temperature difference of images between each window and the surrounding divided windows complies with the default value to obtain a continuity determination result;
determining a second light source type weight of the entered image according to the first light source type weight, the position of each divided window, and the continuity determination result, wherein the second light source type weight includes a plurality of outdoor light source type weights and a plurality of indoor light source type weights; and
determining the weight of the color white identification result of each divided window according to the position of each divided window, the continuity determination result and the second light source type weight.

3. The white balance method of claim 2, wherein the step of dynamically determining the first light source type weight of the entered image according to the brightness value of the entered image further comprises:
using a plurality of color windows which are contained in the image and in compliance with a preset data, and the brightness value of the entered image to determine a first light source type weight of the entered image.

4. The white balance method of claim 1, further comprising:
selecting one or more color white identification windows from each divided window according to an image characteristic of the window, and using image data of the one or more color white identification windows to perform the color white identification; wherein the image characteristic is a neutral color or a flat region.

5. The white balance method of claim 1, further comprising:
determining a color temperature threshold value of the entered image;
correcting the white balance estimated value according to the color temperature threshold value of the entered image if the white balance estimated value is greater than the color temperature threshold value of the entered image;
performing the white balance process by using the white balance estimated value if the white balance estimated value is equal to or less than the color temperature threshold value of the entered image.

6. The white balance method of claim 1, further comprising:
reducing the weight of the color white identification result at least one of the divided window disposed on the upper part of the entered image if a plurality of outdoor light source weight of a second light source type weight of an entered image is greater than a predetermined proportion, and a color temperature of each divided window disposed on the upper part of the entered image is greater than a threshold value and the color temperature difference between the windows is lower than the default value.

7. The white balance method of claim 1, further comprising:
not adjusting the weight of the color white identification result at least one of the divided windows on the upper part of the entered image if a plurality of outdoor light source weights of a second light source type weight of the entered image is smaller than a predetermined proportion, and a color temperature of each divided window on the upper part of the entered image is greater than a threshold value, and the color temperature difference between the windows is lower than the default value.

8. The white balance method of claim 1, further comprising:

reducing the weight of the color white identification result of the at least one divided window at the center of the entered image if a color temperature of a plurality of divided windows at the center of the entered image is smaller than a threshold value, and color temperature values of each divided window and the color temperature difference between the windows is lower than the default value.

9. The white balance method of claim 1, further comprising:

not adjusting the weight of the color white identification result of the divided windows when a plurality of outdoor light source weights of a second light source type weight of the entered image is greater than a predetermined proportion, and the divided window on the upper part of the entered image has a first color temperature, and a color temperature difference between the windows is lower than the default value, and the divided window on the lower part of the entered image has a second color temperature, and the different between the color temperature values of each divided window and the plurality of surrounding divided windows is lower than the default value.

10. A white balance apparatus, comprising:

an image capturing unit, for capturing an entered image;

a dividing unit, coupled to the image capturing unit, for dividing the entered image into a plurality of divided windows;

a color white identification unit, coupled to the dividing unit, for performing a color white identification of each divided window to produce a color white identification result of each divided window;

a color white weight determination unit, coupled to the color white identification unit, for determining a weight corresponding to the color white identification result of each divided window according to the position of each divided window in the entered image and a continuity of the plurality of surrounding divided windows;

a computing unit, coupled to the color white weight determination unit, for calculating a white balance estimated value of the entered image by using the color white identification result and the weight of the divided windows; and a white balance process unit, coupled to the computing unit, for performing a white balance process of the entered image by using the white balance estimated value;

wherein the continuity defines a color temperature difference between each window and a plurality of surrounding divided windows lower than a default value.

11. The white balance apparatus of claim 10, further comprising:

a color white selecting unit coupled to the dividing unit and the color white identification unit, used in each divided window, for determining one or more color white identification windows according to an image characteristic of the window, and using image data from one or more of the color white identification windows as the color white identification; wherein the image characteristic is a neutral color or a flat region.

12. The white balance apparatus of claim 10, further comprising:

a correcting unit, coupled to the computing unit and the white balance process unit, for correcting the white balance estimated value according to a color temperature threshold value of the entered image if the white balance estimated value is greater than the color temperature threshold value of the entered image; and performing the white balance process of the white balance estimated value if the white balance estimated value is equal to or lower than the color temperature threshold value of the entered image.

13. The white balance apparatus of claim 10, wherein the color white weight determination unit further comprises:

a light source type weight computing unit, for determining a first light source type weight;

a position determination unit, coupled to a light source type weight determination unit, for determining a position of the divided window in the entered image; and a continuity determination unit, coupled to the position determination unit, for determining whether the color temperature difference between each divided window and the surrounding divided windows complies with the default value to determine a continuity determination result of each divided window;

wherein, the light source type weight determination unit determines a second light source type weight of the entered image according to the first light source type weight, the position of each divided window, and the continuity determination result of each divided window; and the color white weight determination unit determines the weight of the color white identification result of each divided window according to the position of each divided window, the continuity determination result of each divided window, and the second light source type weight.

* * * * *